United States Patent [19]
Williamson et al.

[11] Patent Number: 5,687,641
[45] Date of Patent: Nov. 18, 1997

[54] HANDLING SHEET MATERIAL

[76] Inventors: Mark Williamson, Siddington House, Siddington, Chesire, United Kingdom, SK11 7LR; Leslie Theophilus Baines, "Cobblestones" Old Hall Mews Old Hall Lane, Heaton Bolton, United Kingdom, BL1 7PW

[21] Appl. No.: 586,734

[22] PCT Filed: Jul. 25, 1994

[86] PCT No.: PCT/GB94/01593
§ 371 Date: Jan. 29, 1996
§ 102(e) Date: Jan. 29, 1996

[87] PCT Pub. No.: WO95/03988
PCT Pub. Date: Feb. 9, 1995

[30] Foreign Application Priority Data

Jul. 29, 1993 [GB] United Kingdom ............... 9315742

[51] Int. Cl.⁶ ............... A21B 3/18; A21C 9/00; A21C 9/04; A23P 1/00
[52] U.S. Cl. ............... 99/450.2; 99/353; 99/450.1; 198/689.1; 198/803.5; 198/811; 198/955; 414/416; 414/790; 414/790.8; 414/793.1; 426/496; 426/512
[58] Field of Search ............... 99/450.1, 450.2, 99/450.4, 450.6, 450.7, 353–355, 383, 427, 439, 442; 198/453, 454, 493, 689.1, 836.1, 803.5, 811, 955; 414/793.1, 790, 790.6, 790.8, 416; 425/168, 310, 316, 436 R, 437, 394; 426/496, 502–505, 512, 516, 331, 549

[56] References Cited

U.S. PATENT DOCUMENTS

| | | | |
|---|---|---|---|
| 3,773,520 | 11/1973 | Longenecker et al. | 426/502 |
| 3,971,481 | 7/1976 | Longenecker et al. | 414/790 |
| 4,620,826 | 11/1986 | Rubio et al. | 414/793.1 |
| 4,938,126 | 7/1990 | Rubio et al. | 99/353 X |
| 5,114,307 | 5/1992 | Meli et al. | 414/793.1 |
| 5,118,515 | 6/1992 | Montemayor et al. | 426/128 |
| 5,295,586 | 3/1994 | Chesnutt et al. | 209/552 |
| 5,311,979 | 5/1994 | Risley et al. | 198/689.1 |
| 5,347,792 | 9/1994 | Meli et al. | 99/453 X |
| 5,458,900 | 10/1995 | Rubio et al. | 426/512 |
| 5,494,398 | 2/1996 | Montemayor et al. | 414/797 |
| 5,540,140 | 7/1996 | Rubio et al. | 99/353 |
| 5,565,220 | 10/1996 | Rubio et al. | 425/168 |

FOREIGN PATENT DOCUMENTS

| | | |
|---|---|---|
| 2736211 | 3/1978 | Germany . |
| 2071622 | 9/1981 | United Kingdom . |

*Primary Examiner*—Timothy F. Simone
*Attorney, Agent, or Firm*—Michael J. Ram; Marvin H. Kleinberg; Marshall A. Lerner

[57] ABSTRACT

This invention relates to a method and apparatus for handling stretchable sheet material, to form a stack of leaves of such material. In particular, although not exclusively, the invention concerns the handling of dough sheets in the manufacture of biscuits or other baked foodstuffs. A first conveyor carries leaves of the material which are transferred to a second conveyor where the leaves are transported in a stacked configuration. Transfer is accomplished by use of an overhead permeable, suction surface movable between the first and second conveyor.

16 Claims, 4 Drawing Sheets

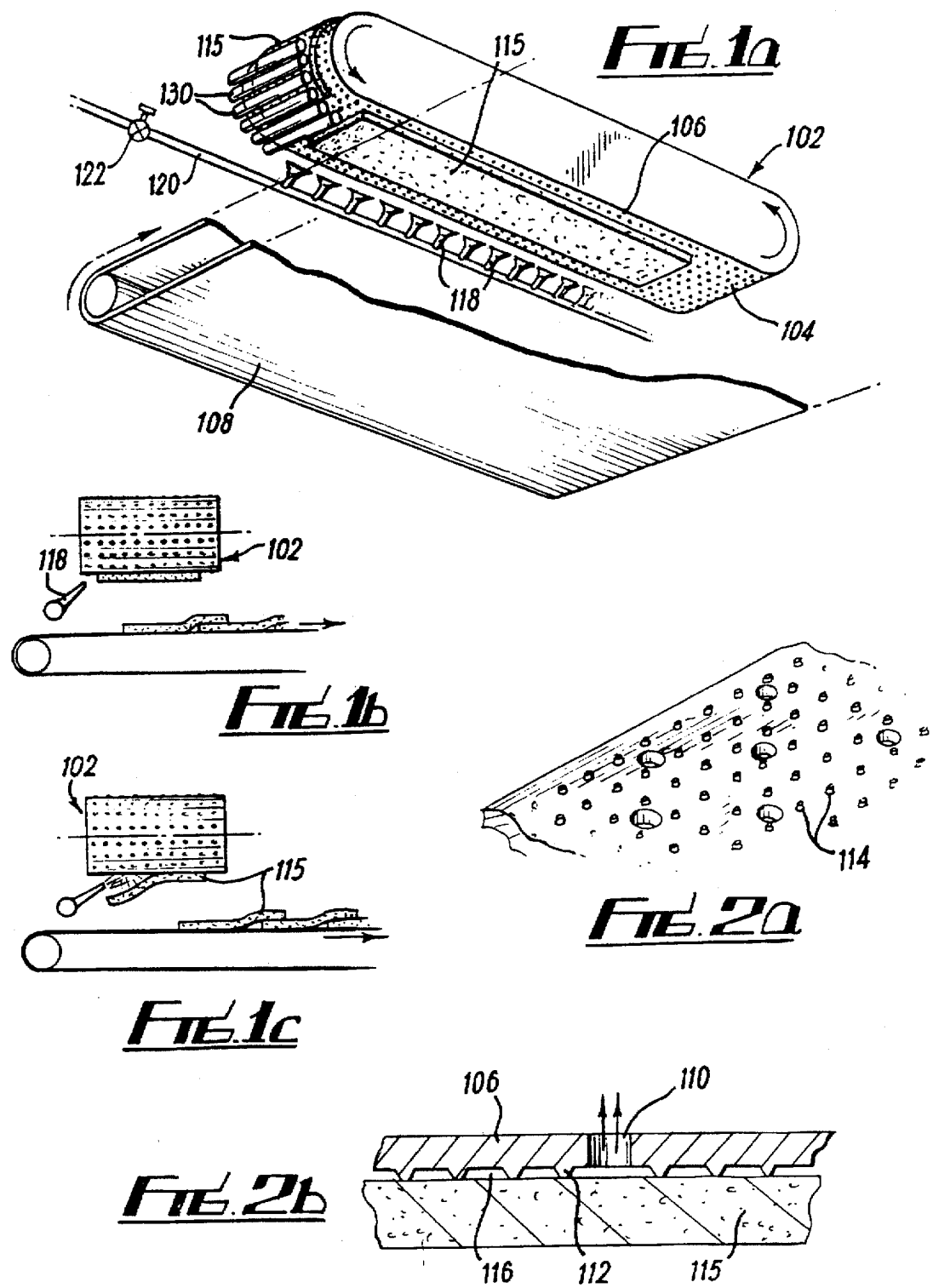

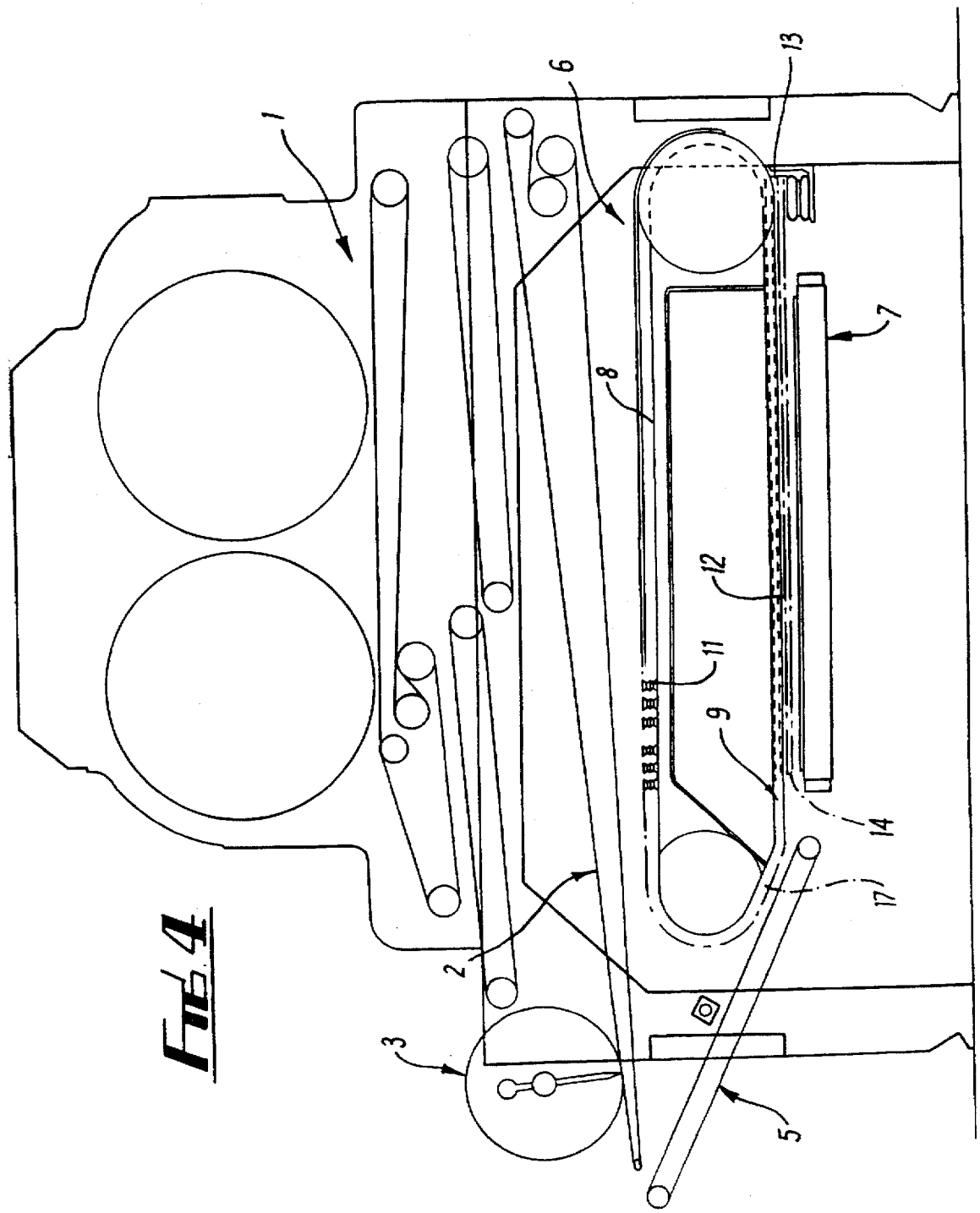

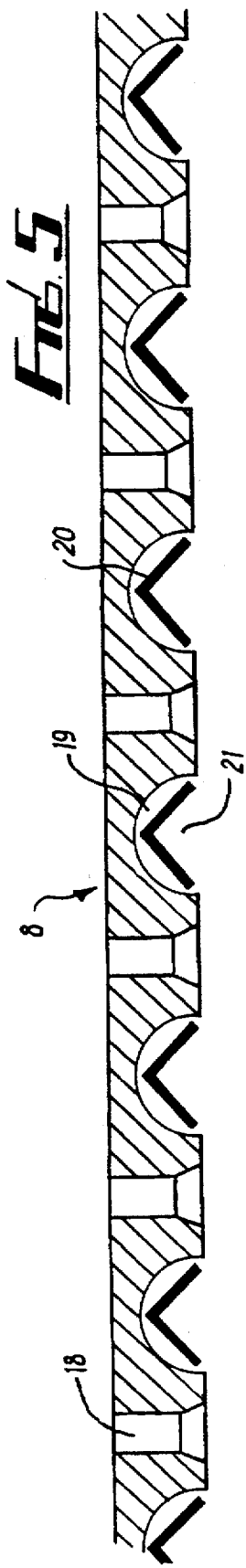
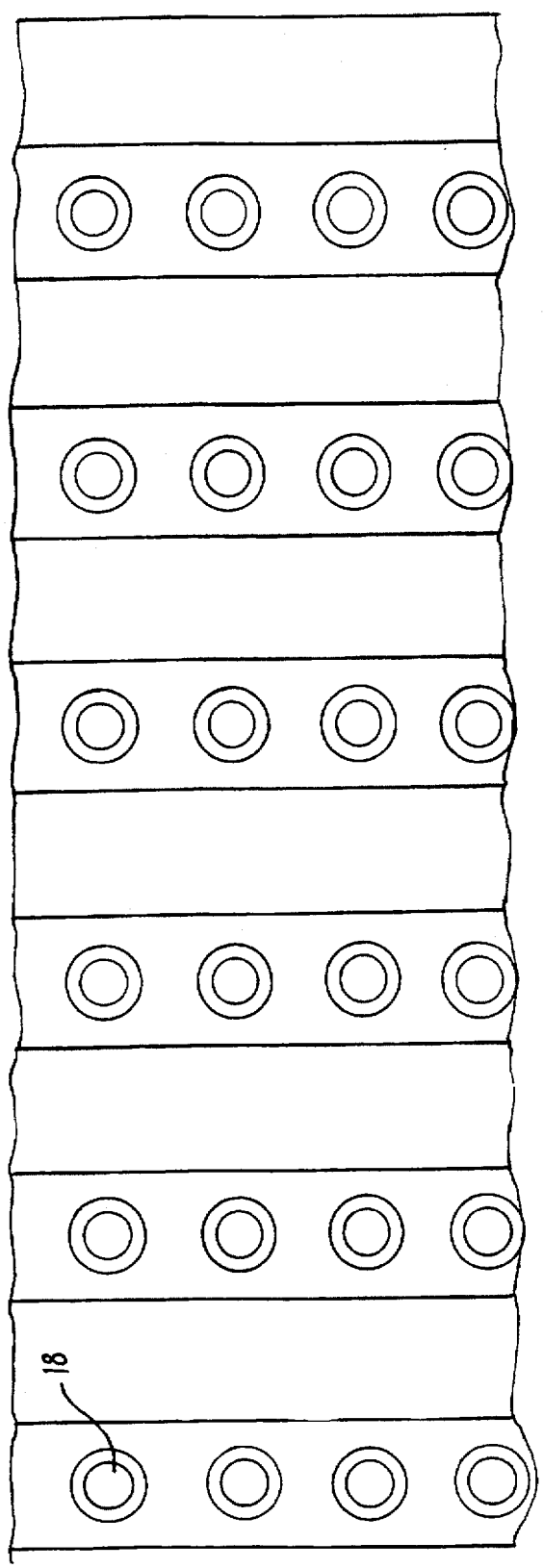

HANDLING SHEET MATERIAL

TECHNICAL FIELD

This invention relates to a method and apparatus for handling stretchable sheet material, and is particularly, although not exclusively, concerned with the handling of dough sheets in the manufacture of biscuits or other baked foodstuffs.

BACKGROUND ART

In the case where biscuits are manufactured by baking multi-layer dough sections, such sections can be formed automatically using an arrangement of first and second conveyors. A continuous dough sheet is fed to the first conveyor. This sheet is cut to individual leaves, and these leaves are then dropped one on top of another in overlapped disposition on to the second conveyor to form a multi-layer stack. The stack is passed through treatment rollers and sections are cut out for baking.

Conventionally the two conveyors are arranged at right angles in L-shaped conformation whereby stacking is achieved by depositing the leaves off the end of the first conveyor onto the second conveyor. This is a convenient mode of achieving stacking but various disadvantages arise. Thus, the L-shaped layout may be inconvenient to accommodate. Also, it is difficult to ensure that the leaves drop precisely in alignment; there is a tendency for skewing to occur because the second conveyor is in motion whilst each sheet is deposited which gives rise to local variations in stack thickness. Moreover, deposition of leaves is monitored to synchronise the cutting of the continuous dough sheet and it can be difficult to achieve accurate monitoring and cutting control; sensor fingers are normally used to detect the positions of the deposited leaves when in the formed stack and this may result in inaccurate monitoring, especially where deposited sheets are offset or skewed, and also the response is slow and is difficult to perform during start up and stopping since it is applied to the formed stack and there is a considerable time delay between the dropping of the sheet and the measuring of the stack edge positions.

Further, conventional edge sensors are positioned to measure the complete stack of sheets, so the one sheet in perhaps six that is protruding most from the stack is measured—all the others are missed by the sensor.

Further, the manner in which the leaves are transferred between the conveyors, especially in so far as this involves an uncontrolled or slack dough loop, may disrupt or adversely affect the dough characteristics bearing in mind the sensitivity to stretching and relaxation thereof.

It is also known to use suction in the transfer of materials between conveyors in the production of baked foodstuffs.

For example, U.S. Pat. No. 4,620,826 describes the transfer of flexible dough products, namely tortillas, from a supply conveyor to a stack on a further conveyor. Transfer is effected by means of an overhead suction surface defined by the bottom run of a perforated belt running beneath a suction box. As discussed in this patent there is the problem of ensuring positive release from the suction surface such as to prevent wrinkling of the tortillas. The patent describes the use of a blocking plate which is moved down by a piston and cylinder to penetrate and block the perforations in the suction surface thereby to allow an underlying tortilla to drop from the surface.

U.S. Pat. No. 3,877,592 describes the use of an overhead suction belt to remove loaves of bread from pans on a first conveyor and then transfer these loaves to a second conveyor. The belt runs beneath a suction box and has perforations leading to flexible suction cups on its outer surface for suction contact with the loaves. The loaves are relatively heavy and therefore can be readily detached from the suction cups for deposition on the second conveyor.

DE-A-3919794 describes the use of a rotor with palettes which is divided into four suction chambers. Biscuit wafers are inverted to make a cream sandwich by passing from a top conveyor to a bottom conveyor around the rotor. The suction is sequenced in the suction chambers to pick up, hold and then deposit the wafers.

DISCLOSURE OF THE INVENTION

An object of the present invention is to provide a suction-based handling method and apparatus which can be performed with convenient equipment and with which careful, accurate control of the movement of the handled material can be achieved.

According to a first aspect of the present invention therefore there is provided an apparatus for handling stretchable sheet material to form a stack of leaves thereof, said apparatus comprising a first supply conveyor for supplying leaves of stretchable sheet material, a second transport conveyor for transporting a stack of said leaves thereon, and a transfer device for transferring said leaves from the first conveyor to the second conveyor in stacked disposition, wherein the transfer device comprises an overhead fluid permeable suction surface movable along a transport run between a first position at which leaves are picked up from the first conveyor and a second position at which said leaves are dropped therefrom onto the second conveyor, and pressure means is provided to establish suction at said surface to hold each leaf by reduced pressure to said surface throughout the whole of said transport run between the first and second position characterised in that a displacement device is provided which is operable to apply a downward force to each leaf at the said second position to effect said dropping of the leaves onto the second conveyor and further characterised in that said surface has individual perforations or apertures through which suction is applied wherein the perforations or apertures are bounded by projections, said projections being inverted frustoconical or frustopyramidal shaped cups or sleeves or dimples.

With this arrangement transfer between the conveyors can be achieved in a carefully controlled manner by appropriate utilisation of the displacement device.

The leaves can be picked up and dropped as required whereby the conveyors can be arranged in any suitable relative disposition. It is not necessary for the conveyors to be in L-shaped conformation. They may, for example, be arranged in a line, although an L-shaped conformation may be used if desired. Also, precise dropping can be achieved with little or no tendency for skewing or other deflection to occur. The whole leaf can be dropped simultaneously i.e. without dragging from one end which can cause jagged edges with stacked sheets.

Also, the deposition can be accurately monitored on individual dropped leaves using any suitable sensor device so as to facilitate accurate operational control and synchronisation even during start up and stopping. Each leaf may be monitored immediately after it is dropped onto the second conveyor so that any adjustments to the drop position of subsequent leaves can be made very rapidly.

The apparatus may be used in any suitable context for any suitable purpose. It is visualised that it will find particular application in the context of the manufacture of baked foodstuffs whereby the stretchable material is dough, a continuous dough sheet is cut to leaves which are supplied to the first conveyor, the stacked leaves are passed through treatment rollers, and multi-layer sections are cut out for baking.

The transfer device may comprise a drum or continuous belt having a perforated surface thereto defining said suction surface, which drum or belt is driven or rotated to effect movement of the suction surface for transfer purposes, and which has an internal suction box or the like to generate suction through the suction surface. Preferably a constant vacuum or reduced pressure is established in the suction box or the like.

The drum or belt preferably runs in-line with the supply conveyor, and the second conveyor may run transversely thereto or in-line therewith as desired. The leaves may be deposited on the supply conveyor from a supply position above the drum or belt using a downwardly inclined feed conveyor. Where the leaves are formed by cutting a continuous strip, the cutting operation may be effected on this feed conveyor.

This arrangement of a downwardly inclined feed conveyor permits construction of a compact "footprint" stacking unit, comprising the drum or belt, the feed conveyor and the first conveyor which can fit conveniently between a main input conveyor or source of material, and the second transport conveyor.

In one embodiment the overhead suction surface is planar (e.g. being provided by a planar belt run) and extends horizontally over planar horizontal runs of the first and second conveyors.

However this arrangement is not essential. It is possible to use inclined or curved or stepped surfaces or runs as appropriate. For example, the first conveyor may be inclined downwardly and the suction surface may be appropriately curved or stepped at the pick up position e.g. to match or conform to the inclination of the supply conveyor at that position.

The suction surface preferably has individual perforations or apertures through which suction is applied and the displacement device preferably comprises one or more pressurised air jets which act to provide the necessary force, acting in the direction away from the suction force, to the leafs to be displaced from the surface.

The perforations or apertures may be bounded by projections such as inverted frustoconical or frustopyramidal shaped cups or sleeves or dimples, whereby the leaves are head by suction at the ends thereof, slightly spaced away from the suction surface. Such a surface provides a uniform suctional force over the whole of the article and avoids the peeling away of the article and non-uniformity of suctional force found when the article abuts onto the perforated surface directly. Furthermore, such a cupped, dimpled or sleeved surface is compatible with articles which are incomplete or have ragged edges or holes formed therein. In addition, supports such as idler rollers may be positioned around the turnround drum in the area where gravitational effects may cause the edge of the dough sheet to peel away from the perforated belt. Such rollers would, preferably, not touch the dough sheet under normal circumstances but if the edge starts to peel away the rollers will support it and offer it back to the belt without allowing the dough sheet to fall away or stretch out of shape. Such rollers allow the vacuum level in the drum to be reduced considerably and thus allow easier removal of the dough sheets with the said pressurised air jets.

Typically, the nozzles of such air jets are positioned in a manner whereby the air is directed through the space that separates the suction surface from the article conveyed. The nozzles of the air jets may extend along one side of the roller to displace the article and this may also, simultaneously, impart a force to the article to displace it laterally with respect to the suction surface.

The air jets typically comprise a series of spaced fish-tail shaped nozzles which are attached to a supply pipe. When the article is in position at the said second location the air blasts out of the nozzles and displaces the article without the necessity of adjusting the suction force and may displace it forward slightly as it does so.

Thus the invention provides a further unique feature whereby the suction force is not temporarily removed in order to release the article. Such a feature avoids the problem of affecting the leading edge of the next article which will tend to fall away from the suction surface when the suction force is removed.

In a further embodiment, the displacement device comprises one or more movable elements, each such element being movable between a retracted position at which it lies on or close to the suction surface, and a displacement position at which is displaced away from the suction surface to engage and apply a displacement force to the leaf to be displaced from the surface. In this case the (or each) displacement element may be positioned between the said cups or sleeves or dimples on or closely spaced relative to the suction surface when in the retracted position.

It is also possible to provide a recess or recesses in the suction surface for the element (or elements) so that in the retracted position this lies at least partially within such surface. This arrangement is particularly suitable for use in the case where the suction perforations or apertures terminate at or close to the suction surface e.g. without the use of cups or sleeves or dimples.

Typically, the movable elements are multiple elongate elements. These may take the form of side by side, preferably parallel, fingers in line with the direction of movement of the suction surface and which are reciprocated or pivoted preferably, simultaneously when moved between the retracted and displacement positions. The fingers may be held at opposite ends and may be reciprocated by means of a suitable reciprocation mechanism applied to both such ends.

Other arrangements are also possible. For example, rotary elongate cam structures may be provided whereby the retracted and displacement positions correspond to different rotary positions of the cam structures.

Where elongate displacement elements are used, these preferably extend along elongate spaced between rows of said perforations or apertures.

Further pressurised air jets may be provided on or alongside the displacement elements to supplement the displacement force and/or for smooth release or cleaning purposes.

Most preferably, the suction pressure persists throughout the suction surface up to and throughout the dispense location so that the leaves are displaced onto the second conveyor substantially without any uncontrolled or slack loop. It is particularly desirable to avoid or minimise such a loop where the leaves are dropped onto the supply conveyor and are picked up by the suction surface to avoid or minimise stretching and distortion.

Preferably, also drive systems for the driven or rotated transfer device and at least the said first supply conveyor are linked, for example by a mechanical link, which may be adjustable so that the speeds can be synchronised and in particular acceleration and deceleration can be matched during starting and stopping. A common motor may be used.

The transfer device and the first conveyor may be driven at the same or different speeds. In one embodiment the linear speed of the transfer device is set slightly faster than that of the first conveyor so that a gap is pulled between successive leaves. Having regard to the inconsistent stretching properties of the leaves, this may result in a variable gap between successive sheets and a sensor may be provided to measure the gap and initiate adjustment of the relative speeds of the first conveyor and the transfer device to give a constant gap size. The sensor may be an optical sensor which uses a light beam directed across the width of the leaves.

According to a second aspect of the present invention there is provided a method of handling stretchable sheet material to form a stack of leaves thereof, wherein a first supply conveyor for supplying leaves of stretchable sheet material, a second transport conveyor for transporting a stack of said leaves thereon, and a transfer device for transferring said leaves from the first conveyor to the second conveyor in stacked disposition, wherein the transfer device comprises an overhead fluid permeable suction surface movable along a transport run between a first position at which leaves are picked up from the first conveyor and a second position at which said leaves are dropped therefrom onto the second conveyor, and pressure means is provided to establish suction at said surface to hold each leaf by reduced pressure to said surface throughout the whole of said transport run between the first and second positions, characterised in that a displacement device is provided which is operable to apply a downward force to each lead at the said second position to effect said dropping of the leaves onto the second conveyor, and further characterised in that said surface has individual perforations and apertures through which suction is applied wherein the perforations or apertures are bounded by projections, said projections being inverted frustoconical or frustopyramidal shaped cups or sleeves or dimples.

The method may have other features, as appropriate, as hereinbefore described, with reference to the apparatus of the first aspect of the invention.

BRIEF DESCRIPTION OF THE DRAWINGS

The invention will now be described further by way of example only and with reference to the accompanying drawings in which:

FIG. 1(a) is a diagrammatic perspective view of one form of transfer device according to the invention for producing a stack of leaves of dough material for use in baking biscuits;

FIGS. 1(b) and 1(c) are diagrammatic end views of the transfer device showing the action of the "air knife" nozzles;

FIG. 2(a) is a diagrammatic view of one form of transfer device belting surface;

FIG. 2(b) is a diagrammatic side view of a dough sheet engaging one form of belting surface;

FIG. 4 is a more detailed view correspond to FIG. 3 of a modified version of the apparatus of FIG. 3;

FIG. 5 is a sectional view of part of a belt of a further modified version of FIG. 3; and FIG. 6 is a plan view of the arrangement of FIG. 5.

BEST MODES FOR CARRYING OUT THE INVENTION

Figure 3:
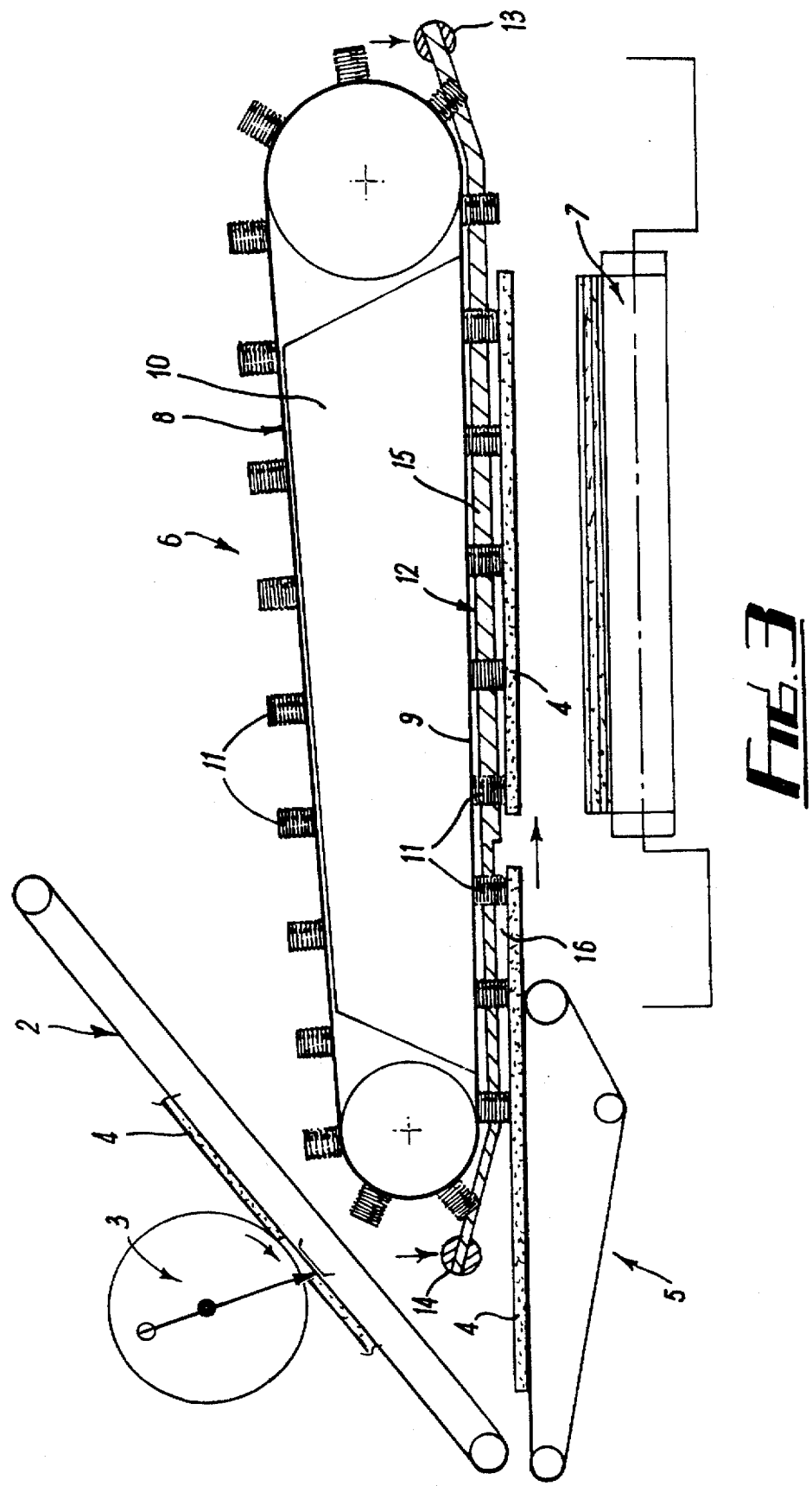
FIG. 3 is a diagrammatic side view of another form of apparatus according to the invention for producing a stack of leaves of dough material for use in baking biscuits.

Referring to FIGS. 1 and 2 a transfer conveyor 102 has a continuous perforated belt 104 which runs around two longitudinally spaced drive drums (not shown) to provide a bottom run 106 which moves transversely to the takeaway conveyor 108. Within the belt 104 there is a suction box (yet to be shown) connected to a suction pump (or other source of low air pressure) so that constant low pressure or suction is applied to the perorations across essentially the entire length and breadth of the bottom run 106.

The perforations 110 are bounded by attached frustoconical projections or cups or dimples 112, 114 which have a limited resilient compressibility, perpendicularly to the belt surface, for shock absorption purposes. The perforations are arranged in longitudinally extending spaced parallel rows which allow the vacuum to be uniform over the whole surface of the dough to be transported and thus provide a matrix of cavities 116 bound by the belt, the projections and the dough 115 which are all under vacuum.

A series of aligned longitudinally spaced fish-tail shaped nozzles 118 are arranged close to the rearward side of the bottom run 106 which act to shoot a jet of air between the said matrix when the dough sheet 115 is located in a predetermined position for reception on the takeaway conveyor 108. The fishtail shaped nozzles 118 are in communication with a supply header pipe 120 which receives a periodic supply of pressurised air at the said predetermined point by way of solenoid valve 122 incorporated into the supply line.

The effect of the pressurised air blast through the said nozzles 118 is to effect an "air knife" across the attached surface of the dough sheet 115 and thus displace the dough from the suction surface allowing it to fall onto the takeaway conveyor for stacking or for immediate removal. Most advantageously, in such an arrangement the suctional force may be kept constant even during release of the dough and thus distortion of following sheets by peeling away of the leading edge thereof is avoided.

A series of parallel idler rollers 130 are provided which are coextensive with the rollers of the transport conveyor and spaced from and arranged around the belt 104 at the area where the leading edge of the transported article begins to enter the bottom horizontal run 106. The rollers act to support the leading edge of the transported article if it begins to fall away from the vacuum belt under the effect of gravity. The rollers are configured to offer the leading edge back to the vacuum belt 104 for delivery to the stacking point.

The use of such idler rollers allows a significant reduction in the vacuum levels, for instance, from −6" to −2" in one application. In addition, this allows easier removal of the transported article.

A further embodiment of the transfer device and the apparatus and installation for use with any of this or such further embodiments will now be described.

In the drawings FIGS. 3–6, the same reference numerals are used throughout for the same parts.

Referring to FIG. 3 of the drawings, stacking apparatus in an installation for use in biscuit manufacture is fed with a continuous dough sheet from an arrangement of multiple rollers and belts 1 (FIG. 4). The sheet is advanced along a downwardly inclined conveyor 2 and a rotary knife 3 is actuated to cut the sheet into individual leaves 4. The leaves 4 are fed from the conveyor 2 to a short supply conveyor 5. From this short supply conveyor 5 the leaves are delivered to a transfer device 6 (either of the type previously described or yet to be described) which deposits the leaves 4 one on top of another on a transport conveyor 7 which is arranged at right angles to the supply conveyor 2.

The stacked (staggered) leaves 4 are transported through treatment rollers (not shown) to form a laminated material. Sections are stamped or cut out from this for baking.

The alternative transfer device 6 comprises an endless perforated belt 8 which runs around drive drums to provide a bottom horizontal run 9 which moves in-line with the conveyor 5 and transversely to the conveyor 7. Within the belt 8 there is a suction box 10 connected to a suction pump (or other source of low air pressure) so that constant low pressure of suction is applied to the perforations across essentially the entire length and breadth of the bottom run 9.

The perforations are bounded by attached cups or sleeves 11 which have a limited resilient compressibility longitudinally (i.e. perpendicularly to the belt surface) for shock absorption purposes. The perforations are arranged in parallel rows extending longitudinally of the belt.

Between the rows there are multiple fingers 12 defined by rigid bars or rods of stepped cross-section, one bar between each pair of adjacent perforation rows.

The bars 12 are mounted at opposite ends 13, 14, respectively beyond the ends of the bottom run 9 of the belt 8. A leading end portion 15 of each bar 12 is of larger cross-section (height) than its remaining trailing end portion 16. the maximum height of each bar 12 is less than the lengths of the sleeves 11.

The bars 12 are simultaneously vertically movable between an uppermost retracted position and a lowermost displacement position. In the retracted position the bars 12 are close to the belt surface and are spaced above the free ends of the sleeves 11. In the displacement position, the bars 12 are moved downwardly so that the bottom surfaces of the larger cross-section portions 15 of the bars 12 are below the free ends of the sleeves 11 but the bottom surfaces of the smaller cross-section trailing portions 16 of the bars are above such free ends.

Reciprocation of the bars 12 is effected with a suitable mechanism which may be mechanically driven or solenoid or motor driven or otherwise operated, acting on the ends 13, 14.

With this arrangement, dough leaves 4 are picked up off the supply conveyor 5 at the trailing end of the bottom run 9. Each lead 4 is held securely to the suction surface throughout the entire surface area of the leaf, by engagement with the free ends of the suction sleeves 11, until the lead reaches a position at which it is wholly over the second conveyor 7. In this position the leaf 4 is wholly within the confines of the larger cross sectional area portions 15 of the fingers 12.

The fingers 12 then move downwards to displace the leaf 4 off the sleeves on to the conveyor 7, and then the fingers 12 are moved back upwards to their normal retracted positions. The fingers 12 move downwards to apply a positive essentially uniform force across the leaf 4 so that the leaf drops evenly and promptly onto the conveyor 7 without tendency to distort or stretch or skew or drag.

The apparatus includes an optical gap sensor effective between the leaves 4 on the top of the conveyor 5. This measures the gap between the leaves 4 and adjusts the linear feed speed of the conveyor 2 relative to the linear speed of the conveyor 5 to maintain the gap constant at a predetermined size.

The system also includes an edge position sensor which senses the edges of each dropped leaf on the conveyor 7, immediately after it has been dropped so that adjustments to the dropped position of subsequent leaves can be made very quickly (e.g. by automatic change in the timing of the mechanisms which reciprocates the fingers 12 or of the speed of the transfer device 6).

Most preferably a common drive motor (not shown) is used particularly for the conveyor 5 and the transfer device 6 which are linked to the motor by adjustable mechanical linkages. In this way predetermined relative or synchronised speeds can be maintained irrespective of fluctuations or periods of acceleration and deceleration. Stretching, distortion and incorrect placing can therefore be avoided or at least minimised.

FIG. 3 shows the supply conveyor 5 and the bottom run 9 of the belt 8 arranged in horizontal disposition.

As shown in FIG. 4, the supply conveyor 5 may be downwardly inclined and the bottom run 9 af the belt 8 may be stepped to provide a lead-in trailing end inclined pick up portion 17 parallel to the conveyor 5.

As indicated in FIG. 4, it is not necessary for the fingers 12 to be mounted at each end and to have stepped cross-section portions. Instead it is possible to use fingers 12 which are mounted only at their heading ends 13 and which have fee trailing ends 14.

In this case the fingers 12 would be of a length shorter than the bottom run 9 so that the fingers 12 are long enough to extend throughout the leading picked up leaf when this is at the displacement position over the second belt 7 but not long enough to overlap at the trailing free end 14 with the next picked up (trailing) leaf.

With this arrangement, the free ends 14 of the fingers 12 are preferably curved or tapered to avoid any problems of catching or snagging with the belt 8 or the next leaf 4.

As shown in FIGS. 3 and 4, it is possible to use belt perforations 18 without the cups or sleeves 11. In this case perforations 18 are preferably flared outwardly at their outermost ends, and the belt 8 have inset channels 19 for displacement fingers 20.

The fingers 20 extend, as in the embodiment of FIG. 1 only throughout the displacement position over the second conveyor 8 and not in the vicinity of the pick up position.

The fingers 20 may be reciprocated in like manner to the fingers 12 of FIG. 2.

Alternatively the fingers 20 may be shaped as cam structures whereby a rotary mechanism is used for displacement purposes. Thus, as shown, the fingers 20 may comprise elongate angle members which are rotated, e.g. about an axis 21 level with the outer surface of the belt so that the members 20 are movable between a retracted position (as shown) and a displacement position at which they project downwardly from the outer surface of the belt.

It is of course to be understood that the invention is not intended to be restricted to the details of the above embodiments which are described by way of example only.

Thus, for example, although some of the above embodiments, as described have fingers 12 or 20 which move downwardly for displacement purposes uniformly along their length, it is possible to use an arrangement in which the movement is not uniform e.g. by displacing downwardly the leading ends 13 of the fingers ore than the trailing ends 14 so that the leaf 4 is peeled progressively from the belt 8. This may be achieved by pivoting the fingers about their trailing ends or otherwise as desired.

Also, the fingers may have air blown through conduits therein to emerge through holes along their length for constant cleaning to prevent sticking.

What is claimed is:

1. Apparatus for handling stretchable sheet material to form a stack of leaves thereof, said apparatus comprising a first supply conveyor (5) for supplying leaves (4) of stretchable, sheet material, a second transport conveyor (7) for transporting a stack of said leaves thereon, and a transfer device (102;6) for transferring said leaves from the first conveyor (5) to the second conveyor (7) in stacked disposition, wherein the transfer device (102;6) comprises an overhead fluid permeable suction surface (104;8) movable along a transport run (106;9) between a first position at which leaves are picked up from the first conveyor (5) and a second position at which said leaves are dropped therefrom onto the second conveyor (7), and pressure means (10) is provided to establish suction at said surface (104;8) to hold each leaf by reduced pressure to said surface (104;8) throughout the whole of said transport run between the flirt and second position characterised in that a displacement device (118;12) is provided which is operable to apply a downward force to each leaf at the said second position to effect said dropping of the leaves onto the second conveyor (7) and further characterised in that said surface (104;8) has individual perforations or apertures (110;18) through which suction is applied wherein the perforations or apertures (110;18) are bounded by projections, said projections being inverted frustoconical or frustopyramidal shaped cups or sleeves or dimples (112,114;11).

2. An apparatus as claimed in claim 1, wherein a continuous sheet is cut to leaves which are supplied to the first conveyor (5), the stacked leaves are passed through treatment rollers, and multi-layer sections are stamped-out for baking.

3. An apparatus as claimed in claim 1, wherein the transfer device comprises a drum or continuous belt (102;6) having a perforated surface thereto defining said suction-surface (104;8), which drum or belt is driven or rotated to effect movement of the suction surface for transfer purposes, and which has an internal suction box (10) or the like to generate suction through, the suction surface.

4. An apparatus as claimed in claim 1, wherein the displacement device comprises one or more pressurised air jets (118) which act to provide the necessary force, acting in the direction away from the suction force, to the leaf to be displaced from the surface.

5. An apparatus as claimed in claim 1, wherein the leaves are held by suction at the ends of the said projections (112,114;11) on the suction surface and thus slightly spaced away from the suction surface.

6. An apparatus as claimed in claim 1, wherein the displacement device comprises one or more pressurised air jets, said air jets nozzles (118) which are positioned in a manner whereby the air is directed through the space that separates the suction surface from the article conveyed.

7. An apparatus as claimed in claim 1, wherein the displacement device comprises one or more movable elements (12), each such element being movable between a retracted position at which it lies on or close to the suction surface, and a displacement position at which it is displaced away from the suction surface to engage and apply a displacement force to the leaf to be displaced from the surface.

8. An apparatus as claimed in claim 1, wherein the displacement device comprises one or, more movable elements wherein said movable elements are multiple elongate elements (12).

9. An apparatus as claimed in claim 1, wherein the displacement device comprises one or more movable-elements wherein the said elements take the form of side by side parallel fingers (12) in line with the direction of movement of the suction surface and which are reciprocated or pivoted.

10. An apparatus as claimed in claim 1, wherein the displacement device comprises one or more movable elements wherein said movable elements are elongate elements which further comprise rotary elongate cam structures (20) whereby the retracted end displacement positions correspond to different rotary positions of the cam structure.

11. An apparatus as claimed in claim 1, wherein pressurised air jets (118) are provided to supplement the displacement force.

12. An apparatus as claimed in claim 1, wherein support means (130) are provided which act to support the articles or stretchable sheet material and return them to the suction surface (104;8) if they fall away therefrom prior to the action of the displacement device (118;12).

13. An apparatus as claimed in claim 1, wherein support means (130) are provided, said support means comprising rollers, spaced from the suction surface of the transfer device (102;6) at an area where the said moveable surface enters an overhead position.

14. An apparatus as claimed in claim 1, wherein the stretchable material is dough.

15. A method of handling a stretchable sheet material to form a stack of leaves thereof, wherein said leaves are received by a transfer device from a first supply conveyor and are transferred by such device to a second transport conveyor to be deposited thereon one on top of another, wherein the transfer device comprises an overhead movable, fluid permeable suction surface and pressure means is provided for establishing suction at said surface to pick up and retain said leaves, characterised in that the leaves are displaced off the suction surface on to the second conveyor by operation of a displacement device which applies a downward force to each leaf and wherein the overhead movable suction surface has individual perforations or apertures through which suction is applied wherein the perforations or apertures are bounded by projections.

16. A method as claimed in claim 15, wherein the stretchable material is dough.

* * * * *